(12) United States Patent
Fritts

(10) Patent No.: US 9,085,330 B2
(45) Date of Patent: Jul. 21, 2015

(54) FAIRING MOUNTING ASSEMBLY

(71) Applicant: Jeffrey C. Fritts, Kirkland, WA (US)

(72) Inventor: Jeffrey C. Fritts, Kirkland, WA (US)

(73) Assignee: PACCAR Inc, Bellevue, WA (US)

( * ) Notice: Subject to any disclaimer, the term of this patent is extended or adjusted under 35 U.S.C. 154(b) by 233 days.

(21) Appl. No.: 13/800,308

(22) Filed: Mar. 13, 2013

(65) Prior Publication Data

US 2014/0265433 A1    Sep. 18, 2014

(51) Int. Cl.
*B62D 35/00* (2006.01)

(52) U.S. Cl.
CPC ................... *B62D 35/001* (2013.01)

(58) Field of Classification Search
CPC ............... B60J 7/08; B60J 7/16; B60J 7/185; B60J 7/19; B60J 7/194; B60J 9/04; B60R 9/04; B60R 9/05; B60R 9/052; B60R 9/058; B62D 35/00; B62D 35/001; B62D 37/02
See application file for complete search history.

(56) References Cited

U.S. PATENT DOCUMENTS

| 2,863,695 | A | * | 12/1958 | Stamm | 296/180.2 |
| 2,914,231 | A | * | 11/1959 | Hornke | 224/316 |
| 3,519,178 | A | * | 7/1970 | Stephen | 224/316 |
| 3,695,673 | A | * | 10/1972 | Meadows | 296/180.2 |
| 3,822,910 | A | * | 7/1974 | Wiley, Jr. | 296/180.3 |
| 3,854,769 | A | * | 12/1974 | Saunders | 296/180.4 |
| 3,904,236 | A | * | 9/1975 | Johnson et al. | 296/180.2 |
| 3,947,065 | A | * | 3/1976 | Geiger | 296/180.3 |
| 3,972,556 | A | * | 8/1976 | Mason, Jr. | 296/180.2 |
| 4,082,341 | A | * | 4/1978 | Gore | 296/180.2 |
| 4,313,635 | A | * | 2/1982 | Front | 296/180.3 |
| 4,337,975 | A | * | 7/1982 | Tamamushi et al. | 296/215 |
| 4,346,932 | A | * | 8/1982 | Iwata et al. | 296/218 |
| 4,351,560 | A | * | 9/1982 | Kanou et al. | 296/218 |
| 4,408,792 | A | * | 10/1983 | Sullivan | 296/180.2 |
| 4,470,628 | A | * | 9/1984 | Husted | 296/180.3 |
| 4,688,841 | A | * | 8/1987 | Moore | 296/180.4 |
| 4,715,649 | A | * | 12/1987 | Bores et al. | 296/218 |
| 4,749,220 | A | * | 6/1988 | Adams et al. | 296/180.3 |
| 4,767,154 | A | * | 8/1988 | Okamoto et al. | 296/218 |
| 4,821,394 | A | * | 4/1989 | Martinez-Vera | 29/401.1 |
| 4,858,803 | A | * | 8/1989 | Gerber | 224/329 |
| 4,883,307 | A | * | 11/1989 | Hacker et al. | 296/180.2 |
| 5,249,837 | A | * | 10/1993 | Luttrell | 296/180.3 |
| 5,360,253 | A | * | 11/1994 | Sasaki et al. | 296/180.1 |
| 5,458,392 | A | * | 10/1995 | Chen et al. | 296/180.2 |

(Continued)

FOREIGN PATENT DOCUMENTS

| CA | 2166495 A1 | * | 7/1997 | B62D 35/00 |
| DE | 3135126 A1 | * | 4/1982 | B60J 7/04 |

(Continued)

*Primary Examiner* — Glenn Dayoan
*Assistant Examiner* — Paul Chenevert
(74) *Attorney, Agent, or Firm* — Christensen O'Connor Johnson Kindness PLLC

(57) ABSTRACT

A fairing mounting assembly for securing a fairing to a vehicle includes a fairing locator assembly having at least one fairing locator securable to an interior surface of a forward portion of a fairing, wherein the at least one fairing locator has a predetermined size and shape. The fairing mounting assembly further includes a locator attachment assembly securable to a portion of a vehicle that has at least one isolator receptacle that is substantially sized and shaped to correspond to the predetermined size and shape of the at least one fairing locator. The fairing mounting assembly further includes a rear fairing attachment assembly configured to secure an aft portion of the fairing to the vehicle.

22 Claims, 6 Drawing Sheets

(56) References Cited

U.S. PATENT DOCUMENTS

| | | | | |
|---|---|---|---|---|
| 5,603,549 | A * | 2/1997 | Chen et al. | 296/180.1 |
| 6,283,531 | B1 * | 9/2001 | Tanigawa et al. | 296/103 |
| 6,929,318 | B2 * | 8/2005 | Homann et al. | 296/218 |
| 7,111,570 | B1 * | 9/2006 | Drews | 114/67 R |
| 2005/0281042 | A1 * | 12/2005 | Kawai | 362/493 |
| 2006/0028057 | A1 * | 2/2006 | Kurtz et al. | 296/218 |
| 2008/0244907 | A1 * | 10/2008 | Boucher | 29/897.2 |
| 2009/0026238 | A1 * | 1/2009 | Binder et al. | 224/309 |
| 2012/0292945 | A1 * | 11/2012 | Nusbaum | 296/180.4 |
| 2014/0265434 | A1 * | 9/2014 | Nelson et al. | 296/180.2 |

FOREIGN PATENT DOCUMENTS

| | | | | |
|---|---|---|---|---|
| DE | 3329407 | A1 * | 2/1985 | B60J 7/10 |
| DE | 3720403 | A1 * | 12/1988 | B60R 9/04 |
| DE | 102005009257 | B3 * | 9/2006 | B60R 9/058 |
| DE | 202013007750 | U1 * | 9/2013 | G09F 21/04 |
| FR | 1150551 | A * | 1/1958 | B60J 7/08 |
| FR | 2018616 | A1 * | 6/1970 | B60R 9/05 |
| FR | 2527530 | A1 * | 12/1983 | B60R 9/055 |
| JP | 61202920 | A * | 9/1986 | B60J 7/08 |
| WO | WO 2013151418 | A1 * | 10/2013 | B62D 35/00 |

* cited by examiner

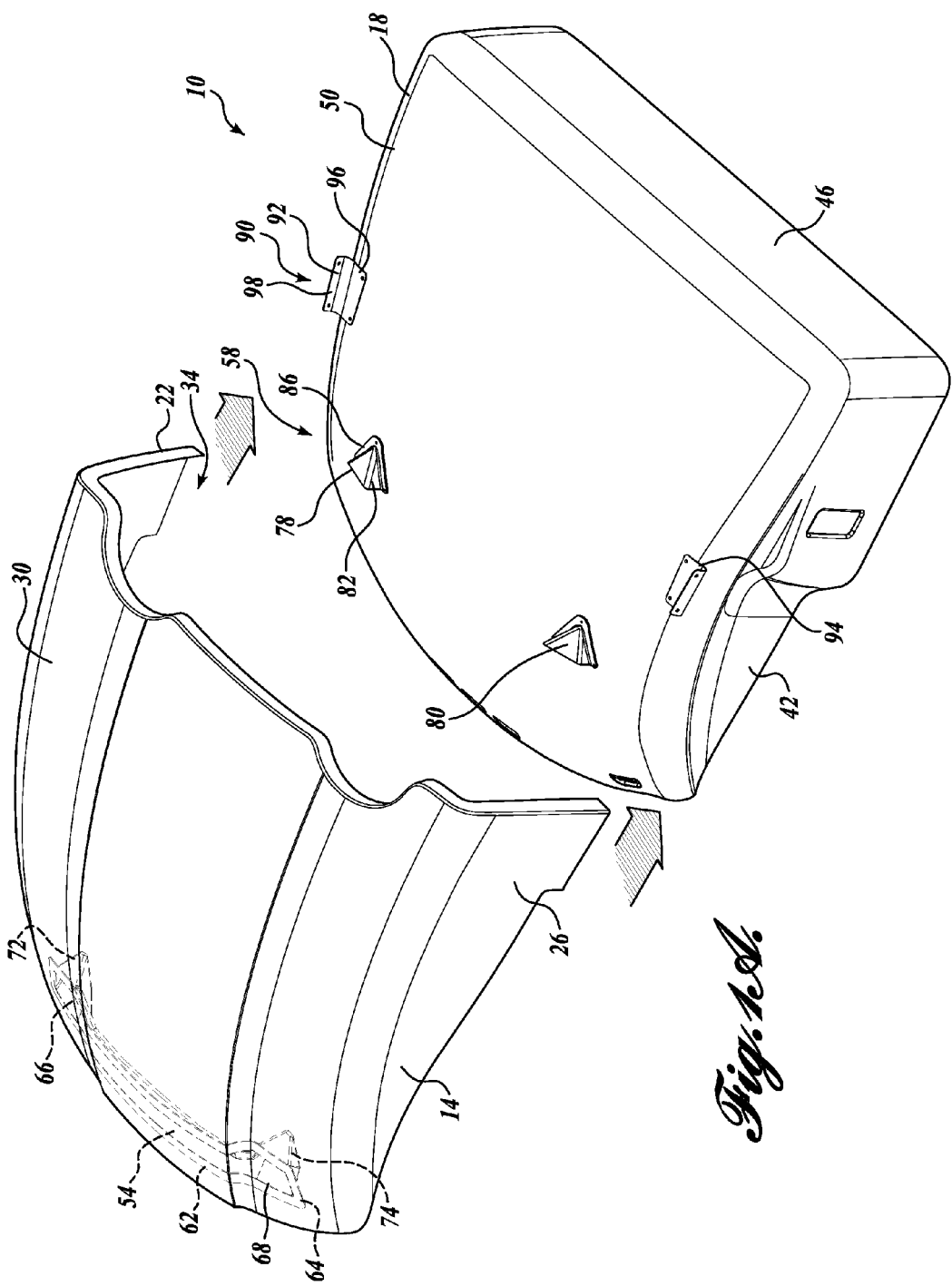

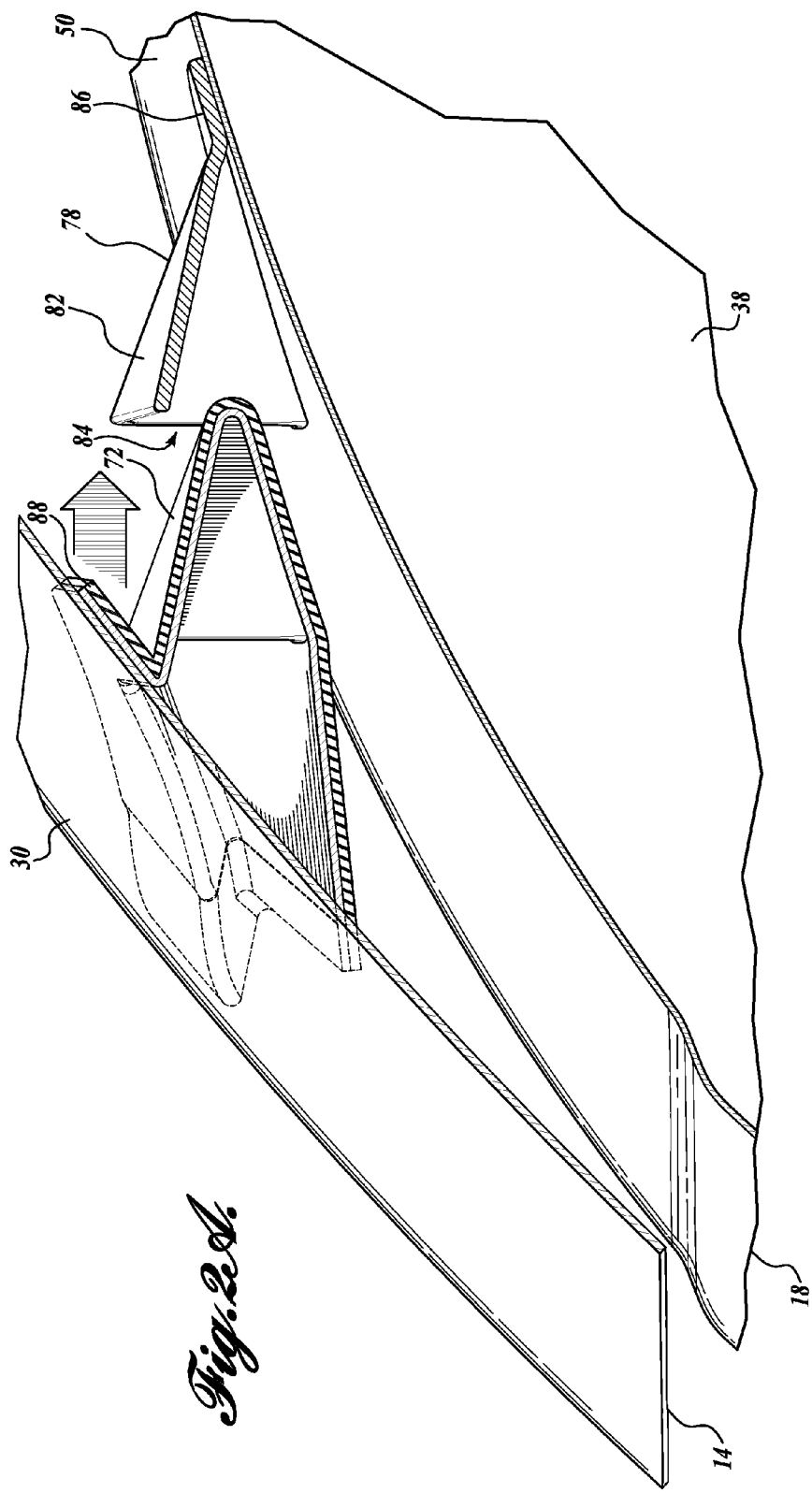

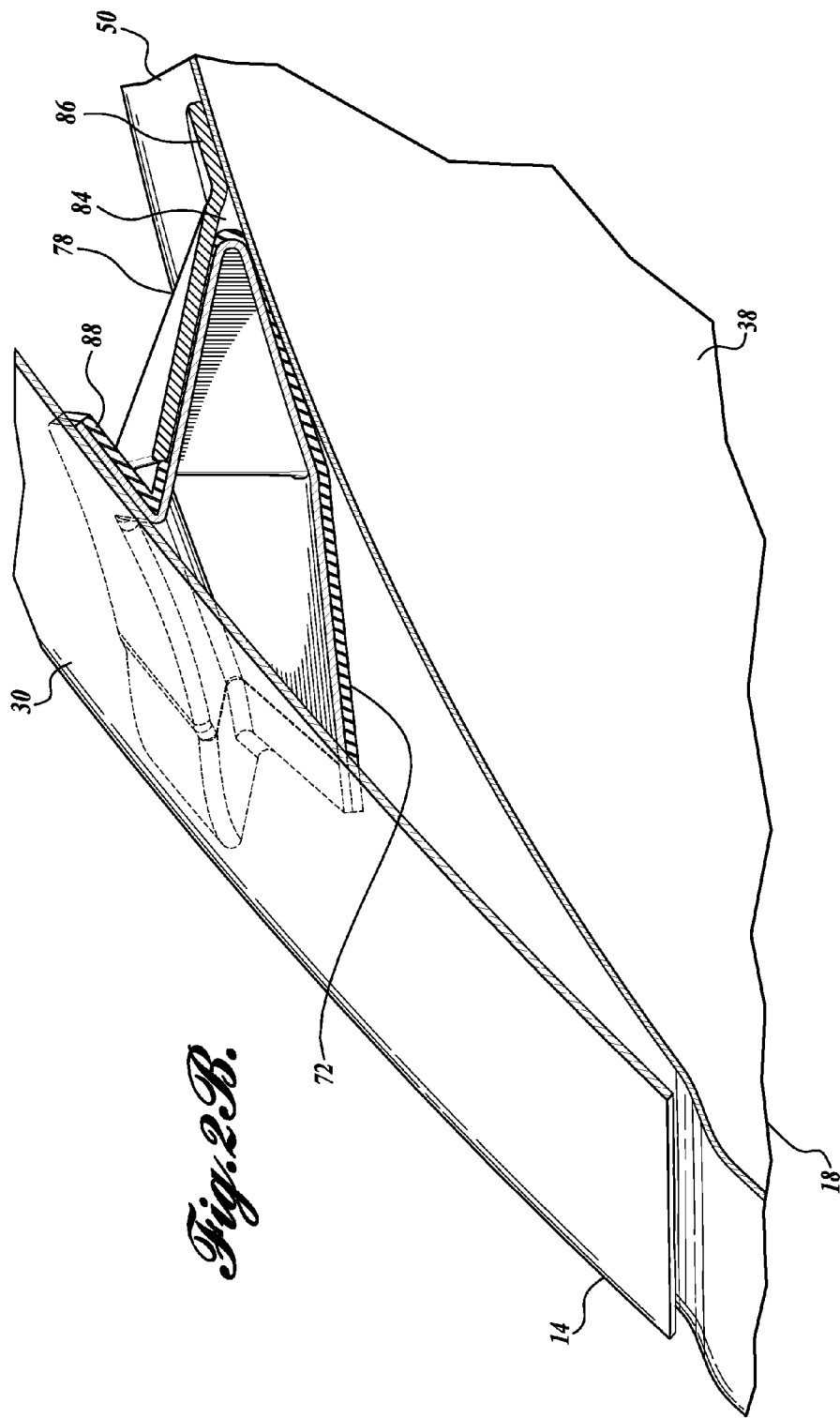

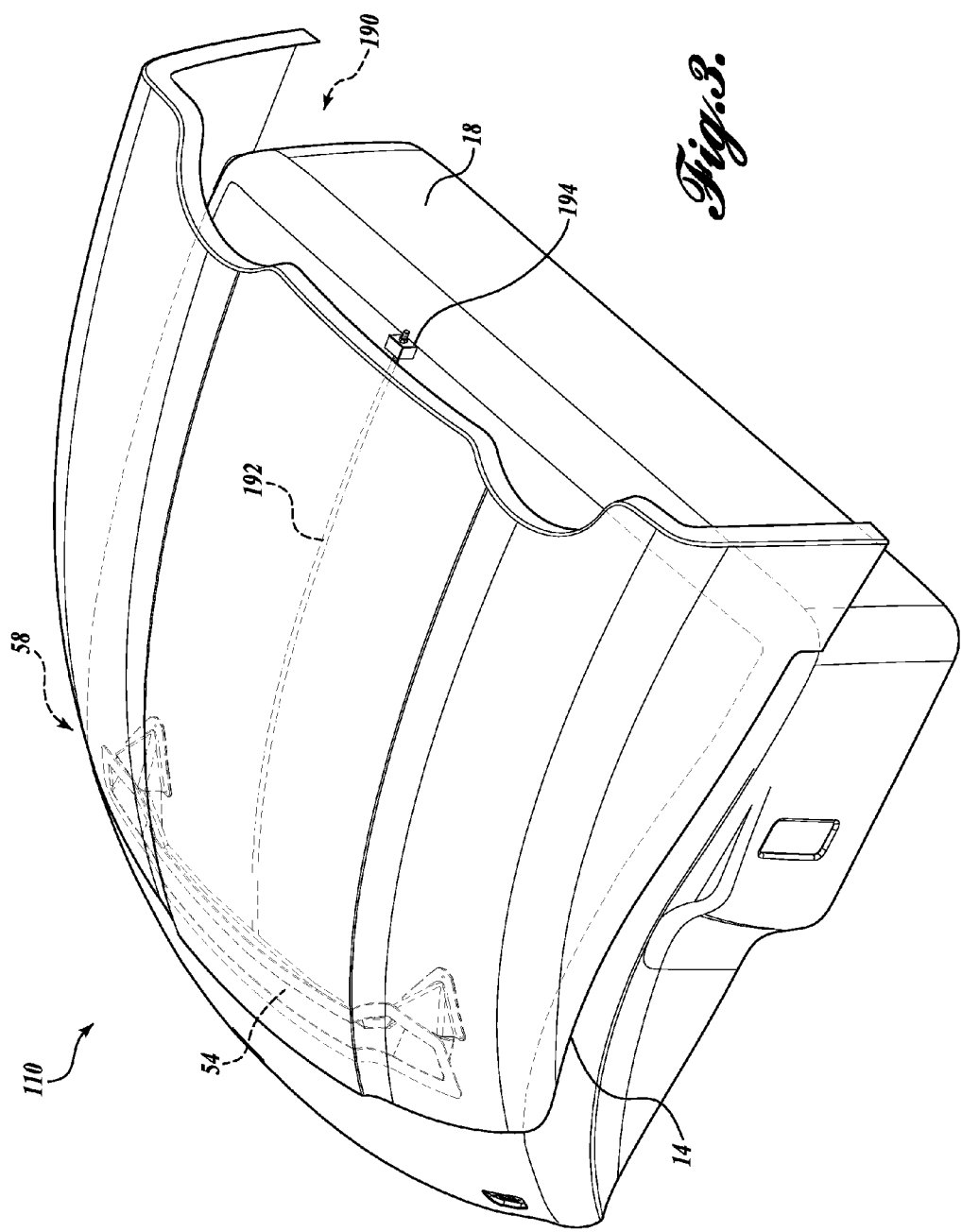

FAIRING MOUNTING ASSEMBLY

BACKGROUND

Semi-trailer trucks often include a roof fairing secured to the roof of the cab or sleeper portion of the vehicle. The roof fairing increases the aerodynamic efficiency of the vehicle, thereby improving fuel economy and reducing operating costs. Although the aerodynamic capability of the roof fairing is important, it is also important that the roof fairing be aesthetically pleasing on the vehicle.

A roof fairing is typically mounted to a sleeper compartment of a truck by passing fasteners through the roof fairing and into the roof. It is necessary to use fasteners to secure the forward portion of the fairing to the sleeper compartment roof because the forward portion of the fairing provides very little access for fastening the fairing from its interior surface. In particular, there is typically less than about 315 mm of space between the roof fairing and the sleeper roof, approximately halfway back on the roof fairing. Thus, it can be appreciated that even less space is provided in the forward portion of the fairing, providing limited access and making it challenging to locate and fasten the roof fairing to the sleeper roof. Accordingly, it is necessary to pass fasteners through the exterior forward portion of the roof fairing for securing the forward end of the roof fairing to the sleeper compartment. The visible fasteners on the fairing diminish the aesthetic finish of the fairing.

Not only does the use of fasteners decrease the aesthetic value of the vehicle, using fasteners to mount the fairing in this manner also complicates installation. For instance, all of the fastener holes in the fairing and the sleeper compartment must be simultaneously aligned in order to secure the fasteners. The operators must make numerous position adjustments to align the fastener holes. Moreover, to compound the issue, the operators are typically eight or nine feet off the ground when installing the fairing. Locating the fairing on the sleeper compartment roof in this manner is cumbersome, time-consuming, and labor-intensive, and it does not provide consistent, repeatable, accurate results.

Thus, there is a desire for an improved assembly for mounting a fairing to a roof of a vehicle that reduces installation time and labor costs, increases repeatability and accuracy of the fairing mounting location, and provides aesthetically pleasing results.

SUMMARY

A fairing mounting assembly for securing a fairing to a vehicle includes a fairing locator assembly having at least one fairing locator securable to an interior surface of a forward portion of a fairing, wherein the at least one fairing locator has a predetermined size and shape. The fairing mounting assembly further includes a locator attachment assembly securable to a portion of a vehicle that has at least one isolator receptacle that is substantially sized and shaped to correspond to the predetermined size and shape of the at least one fairing locator. The fairing mounting assembly further includes a rear fairing attachment assembly configured to secure an aft portion of the fairing to the vehicle.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein:

FIG. 1A is an isometric view of a fairing mounting assembly formed in accordance with a first exemplary embodiment of the present disclosure, wherein the fairing mounting assembly is shown in use with a fairing and a portion of a vehicle, and wherein the fairing is in a first position;

FIG. 2A is a partial side cross-sectional view of the fairing mounting assembly of FIG. 1A, wherein the fairing is in a first position;

FIG. 2B is a partial side cross-sectional view of the fairing mounting assembly of FIG. 1A, wherein the fairing is in a second position;

FIG. 3 is an isometric view of a fairing mounting assembly formed in accordance with a second exemplary embodiment of the present disclosure, wherein the fairing mounting assembly is shown in use with a fairing and a portion of a vehicle, and wherein the fairing is in a second position.

DETAILED DESCRIPTION

Figure 1B:
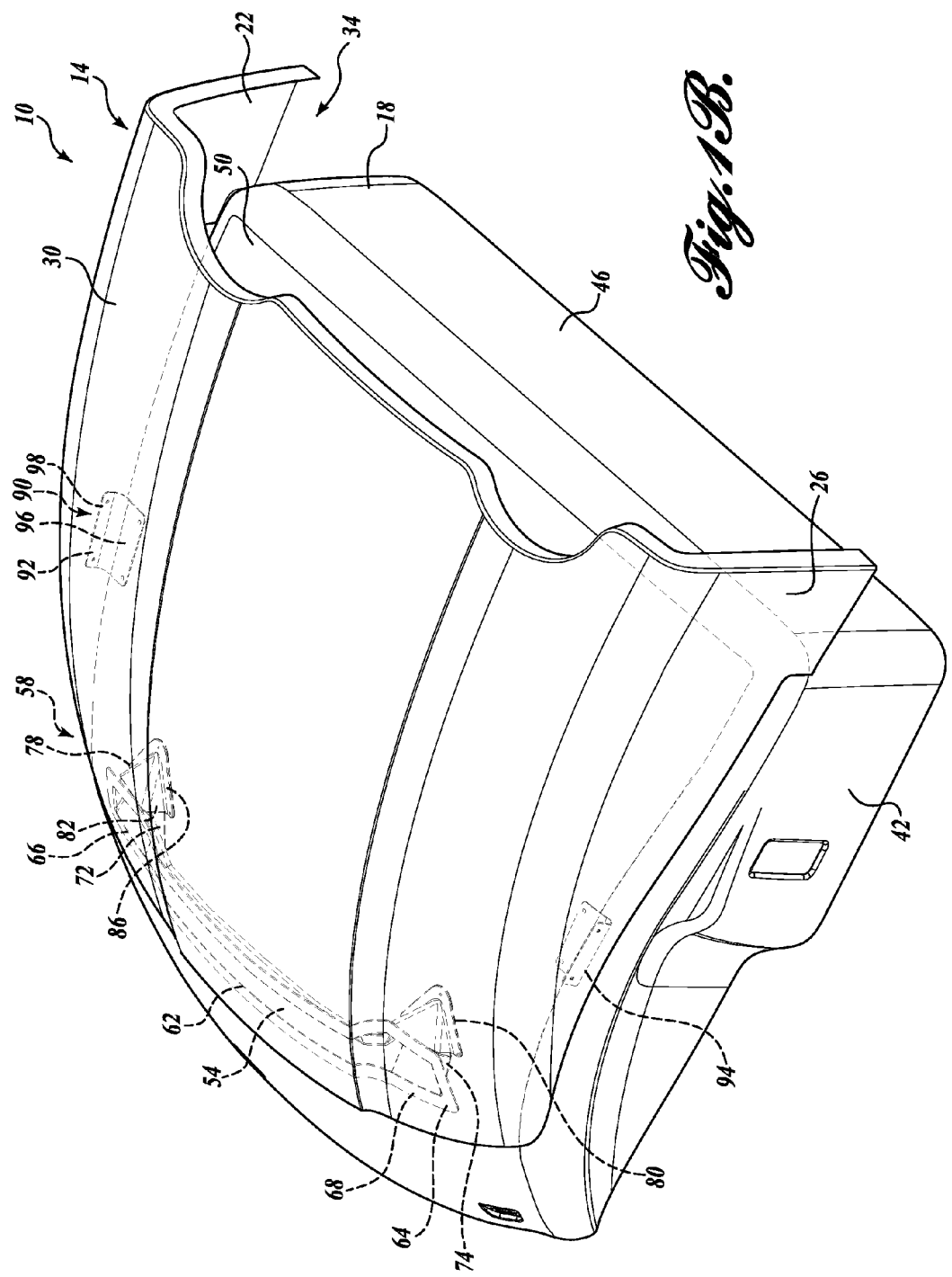
FIG. 1B is an isometric view of the fairing mounting assembly of FIG. 1A, wherein the fairing is in a second position.

A roof fairing mounting assembly 10, formed in accordance with a first exemplary embodiment of the present disclosure may best be seen by referring to FIGS. 1A-2B. The fairing attachment assembly 10 is configured to secure a fairing, such as a roof fairing 14, to a portion of a vehicle, such as a sleeper compartment 18. The fairing attachment assembly 10 helps positively locate the fairing 14 on the sleeper compartment 18, while securing the forward end portion of the fairing 14 to the sleeper compartment 18 without the use of visible exterior fasteners.

The fairing attachment assembly 10 will be hereinafter described as being suitable for mounting a fairing to a portion of a vehicle, such as a sleeper compartment, for Class 8 heavy duty vehicles. However, it will be appreciated that aspects of the claimed subject matter have wide application; and therefore, the fairing attachment assembly 10 may be suitable for use with many types of vehicles and fairing assemblies. Accordingly, the following descriptions and illustrations herein should be considered illustrative in nature, and thus, not limiting the scope of the present disclosure, as claimed.

In the following description, more specific details are set forth in order to provide a thorough understanding of exemplary embodiments of the disclosed and claimed subject matter. It will be apparent to one skilled in the art, however that many embodiments of the claimed subject matter may be practiced without some or all of the specific features described. Moreover, although the sleeper compartment 18 depicted in the figures represents one of the possible applications for the disclosed and claimed subject matter, it should be appreciated that the particular features of the disclosed subject matter can be modified for use with any vehicle on which the inclusion of a roof fairing or any other type of fairing or fairing panel would be appropriate.

Referring to FIG. 1A, the roof fairing 14 and the sleeper compartment 18 on which the roof fairing 14 is mounted will first be briefly described. The fairing 14 includes first and second fairing sidewalls 22 and 26, and a fairing top section 30 extending between the first and second sidewalls 22 and 26. The first and second fairing sidewalls 22 and 26 taper inwardly upwardly and extend outwardly from the forward portion to the aft portion to substantially correspond to and accommodate the shape of the sleeper compartment 18. The first and second fairing sidewalls 22 and 26 also taper at the forward end of the fairing 14, such that the forward end of the fairing 14 is effectively defined by the fairing top section 30. The fairing top section 30 encloses the upper portion of the fairing 14 and helps define a fairing interior cavity 34 between the fairing top section 30 and the first and second fairing sidewalls 22 and 26.

The sleeper compartment 18 includes first and second side sleeper sidewalls 38 and 42, and a rear sleeper sidewall 46 extending therebetween at the rear of the sleeper compartment 18. The first and second side sleeper sidewalls 38 and 42, taper from the back toward the forward end, similar to the roof fairing 14. A sleeper roof 50 extends between the first and second side sleeper sidewalls 38 and 42 and from the forward end of the sleeper compartment 18 to the rear sleeper sidewall 46 to enclose the sleeper compartment 18.

Referring to FIGS. 1A-2B, the fairing attachment assembly 10 will now be described in detail. The fairing attachment assembly 10 generally includes a fairing locator assembly 54 secured to the underside or interior surface of the fairing top section 30, and a locator bracket assembly 58 secured to the exterior surface of the sleeper roof 50. The fairing locator assembly 54 is mateable with the locator bracket assembly 58 to positively locate the roof fairing 14 on the sleeper compartment 18, and to secure the forward end of the roof fairing 14 to the sleeper compartment 18.

The fairing locator assembly 54 includes a reinforcement body portion 62 spanning across the forward end of the roof fairing 14 on the interior surface of the fairing top section 30. An attachment flange 64 extends around the perimeter of the body portion 62 for securing the body portion 62 to the interior surface of the fairing top section 30. The attachment flange 64 may be secured to the interior surface of the fairing top section 30 in any suitable manner, such as by bonding, with fasteners, etc.

The body portion 62 includes first and second ends 66 and 68 that define first and second male portions, or first and second fairing locators 72 and 74. The first and second fairing locators 72 and 74 extend outwardly from the body portion 62 and slightly downwardly toward the sleeper compartment 18 (when the roof fairing 14 is mounted to the sleeper compartment 18). The first and second fairing locators 72 and 74 are each substantially wedge-shaped, having an enlarged base portion defined at the intersection of the fairing locator 72, 74 and the body portion 62, and a tapered tip portion defined at the distal end thereof. Although the fairing locators 72 and 74 may be any suitable wedge shape, in the depicted embodiment, each fairing locator 72 and 74 generally tapers on all four surfaces (top, bottom, first side, and second side) toward the distal end of the locator. The fairing locators 72 and 74 may instead be another suitable tapered or ramp-in shape, such as cone-shaped, frusto-conical shaped, etc.

The body portion 62, attachment flange 64, and first and second fairing locators 72 and 74 of the fairing locator assembly 54 are preferably a composite, molded part made from a suitable material, such as fiberglass, plastic, etc. However, it should be appreciated that the fairing locator assembly 54 may instead be comprised of multiple sections or pieces and may be made in any other suitable manner.

Each of the first and second fairing locators 72 and 74 are receivable within correspondingly shaped first and second locator brackets 78 and 80, respectively, of the locator bracket assembly 58. Each of the first and second locator brackets 78 and 80 are secured in a spaced location on the sleeper roof 50 for mating with the first and second fairing locators 72 and 74 when the fairing 14 is slid aft on the sleeper roof 50. It should be appreciated that the fairing locator assembly 54 may instead include only one fairing locator, or three or more fairing locators that are mateable with only one locator bracket or three or more locator brackets of the locator bracket assembly 58. Thus, the exemplary fairing locator assembly 54 and locator bracket assembly 58 described and illustrated herein should not be seen as limiting.

The first and second locator brackets 78 and 80 are substantially identical; and therefore, only the first locator bracket 78 will be described in detail. The first locator bracket 78 includes a female tapered body 82 having an attachment flange 86 extending substantially around its perimeter. The first locator bracket 78 is secured to the sleeper roof 50 through the attachment flange 86 (with adhesive, fasteners, etc.) or in another suitable manner. When attached to the sleeper roof 50, the tapered body 82 defines a female locator receptacle 84 between the interior surface of the body 82 and the sleeper roof 50. The female locator receptacle 84 is sized and configured to receive the male, first fairing locator 72 to define an interference fit between the tapered body 82 and the first fairing locator 72. In that regard, the locator receptacle 84 is in communication with a forward opening at the enlarged end of the tapered body 82, which faces forwardly for receiving the first fairing locator 72 and guiding it into the locator receptacle 84.

The male, wedge-shaped first and second fairing locators 72 and 74 are guided into the female, wedge-shaped first and second locator brackets 78 and 80 when the fairing is slid aft on the sleeper compartment 18. The ramp-in, wedge shape enables the fairing locators 72 and 74 to enter a large forward opening in the first and second locator brackets 78 and 80 and be guided towards the tapered interior end of tapered body 82. When the first and second fairing locators 72 and 74 are fully received within the first and second locator brackets 78 and 80, as shown in FIG. 1B, the roof fairing 14 is positively located on the sleeper compartment 18. In other words, the roof fairing 14 is set in the appropriate fore/aft, up/down, and cross-car position on the sleeper compartment 18.

Positively locating the roof fairing 14 on the sleeper compartment 18 in this manner reduces installation time and complexity. Rather than having to visually align a plurality of fastener holes, the roof fairing 14 is merely slid aft into engagement with the locator bracket assembly 58, which can be detected by a tactile sensation. Moreover, no fasteners are required to secure the forward end of the roof fairing 14 to the sleeper compartment 18. Rather, the interference fit between the first and second fairing locators 72 and 74 and the first and second locator brackets 78 and 80 secure the forward end of the fairing 14 to the sleeper compartment 18.

The fairing attachment assembly 10 includes a rear fairing attachment assembly 90 configured to pull the fairing 14 aft in tension for maintaining the interference fit between the fairing locator assembly 54 and the locator bracket assembly 58. The rear fairing attachment assembly 90 is configured to secure a rear portion of the fairing 14 (accessible though the fairing interior cavity 34) to the sleeper compartment 18 when the fairing locator assembly 54 is mated with the locator bracket assembly 58.

The rear fairing attachment assembly 90 may include any suitable means for securing a rear portion of the fairing 14 to the sleeper compartment 18. In the depicted embodiment, the rear fairing attachment assembly 90 includes first and second roof attachment brackets 92 and 94 securable to the fairing 14 and to the sleeper roof 50 near each of the first and second side sleeper sidewalls 38 and 42. Each roof attachment bracket 92 and 94 may be substantially L-shaped, having a horizontal portion 96 securable to the sleeper roof 50 and a vertical portion 98 extending upwardly therefrom for securement to an interior sidewall of the fairing 14.

The horizontal and vertical portions 96 and 98 of the first and second roof attachment brackets 92 and 94 may be secured to the sleeper roof 50 and interior surface of the first and second fairing sidewalls 22 and 26, respectively, in any suitable manner. For instance, the vertical portion 98 may be bonded to the interior surface of the fairing sidewall 22 or 26, and the horizontal portion 96 may be securable to the sleeper roof 50 through one or more fasteners. In this manner, the first and second roof attachment brackets 92 and 94 travel with the fairing 14 as it is slid aft on the sleeper compartment 18 for mating therewith, and can thereafter be easily secured to the sleeper roof 50.

In the alternative, the first and second roof attachment brackets 92 and 94 may be attached to both the fairing 14 and the sleeper roof 50 after the fairing 14 as it is slid aft on the sleeper compartment 18 for mating therewith. In this alternative configuration, the vertical portion 98 of each bracket may be secured to an internal reinforcement on the fairing sidewall 22 or 26 (such that the fasteners do not protrude through the fairing sidewall 22 or 26). It will be appreciated that any other suitable attachment or bracket assembly may instead be used to secure the rear portion of the fairing 14 to the sleeper compartment 18.

Referring specifically to FIGS. 2A and 2B, the fairing attachment assembly 10 further includes a dampening member or isolator 88 disposed between each of the first and second fairing locators 72 and 74 and the first and second locator brackets 78 and 80, respectively. The isolator 88 is configured to dampen and isolate vibrations between the roof fairing 14 and the sleeper compartment 18. In that regard, the isolator 88 is made from a suitably compressible material, such as neoprene, rubber, etc.

The isolator 88 may be adhered to or otherwise secured to the exterior surface of each fairing locator 72 and 74, and it covers a substantial portion of or substantially all of the exterior surface of each fairing locator 72 and 74. The overall size of the fairing locator 72, 74 and the isolator 88 is larger than the isolator receptacle 84 of the respective isolator bracket 78, 80 when the isolator 88 is not compressed. As such, when the fairing locator 72, 74 is mated within the respective isolator bracket 78, 80, the isolator 88 compresses to define a tight, interference fit therebetween, while isolating and dampening vibrations.

FIGS. 2A and 2B depict the first fairing locator 72 moving between a first position, wherein the first fairing locator 72 is disengaged from the first locator bracket 78 (FIG. 2A), and a second position, wherein the first fairing locator 72 is engaged or mated with the first locator bracket 78 (FIG. 2B). Referring to FIG. 2A, when the first fairing locator 72 is disengaged from the first locator bracket 78, the material of the isolator 88 is in its original, nondeformed, noncompressed state. As such, the overall size of the first fairing locator 72 and isolator 88 is slightly larger than the locator receptacle 84 of the first locator bracket 78.

Referring to FIG. 2B, when the first fairing locator 72 is mated with the first locator bracket 78, the material of the isolator 88 is at least partially compressed to enable the first fairing locator 72 to be fully received within the first locator bracket 78. The isolator 88 fills in any gaps or spaces between the exterior surface of the first fairing locator 72 and the interior surface of the first locator bracket 78, which helps define the precise location of the fairing 14 on the sleeper compartment 18 and helps prevent any movement or rattling between the fairing 14 and the sleeper compartment 18.

Referring to FIG. 3, a second exemplary embodiment of a fairing attachment assembly 110 is depicted. The fairing attachment assembly 110 is substantially identical to the fairing attachment assembly 10 described above, except that it includes a fairing attachment assembly 190 having a cable 192. The cable 192 extends between an interior forward portion of the roof fairing 14 and a rear portion of the sleeper compartment 18 to pull the fairing 14 in the aft direction for maintaining the interference fit between the fairing locator assembly 54 and the locator bracket assembly 58.

In particular, the first end of the cable 192 may be secured to the interior forward portion of the fairing 14 by any suitable means, such as with fasteners, hooks, etc. The second end of the cable 192 may be received within a cable adjustment mechanism 194 secured to the sleeper compartment 18. The cable adjustment mechanism 194 is suitable for increasing or decreasing the tension in the cable 192 for either moving the fairing 14 into a disengaged position from the sleeper compartment 18, or for applying tension to the fairing 14 in the aft direction.

In FIG. 3, the cable 192 is shown in a substantially taught position, with the cable 192 applying tension in the aft direction. However, before the roof fairing 14 is mounted to the sleeper compartment 18, the cable 192 may be sufficiently loose and/or unattached from the cable adjustment mechanism 194 to allow for the operator to positively locate and secure the roof fairing 14 to the sleeper compartment 18. When the fairing locator assembly 54 is positively secured to and mated with the locator bracket assembly 58, the cable 192 may be either secured to the cable adjustment mechanism 194 and/or adjusted in length and tension such that it maintains the connection between the roof fairing 14 and the sleeper compartment 18.

Figure 4:
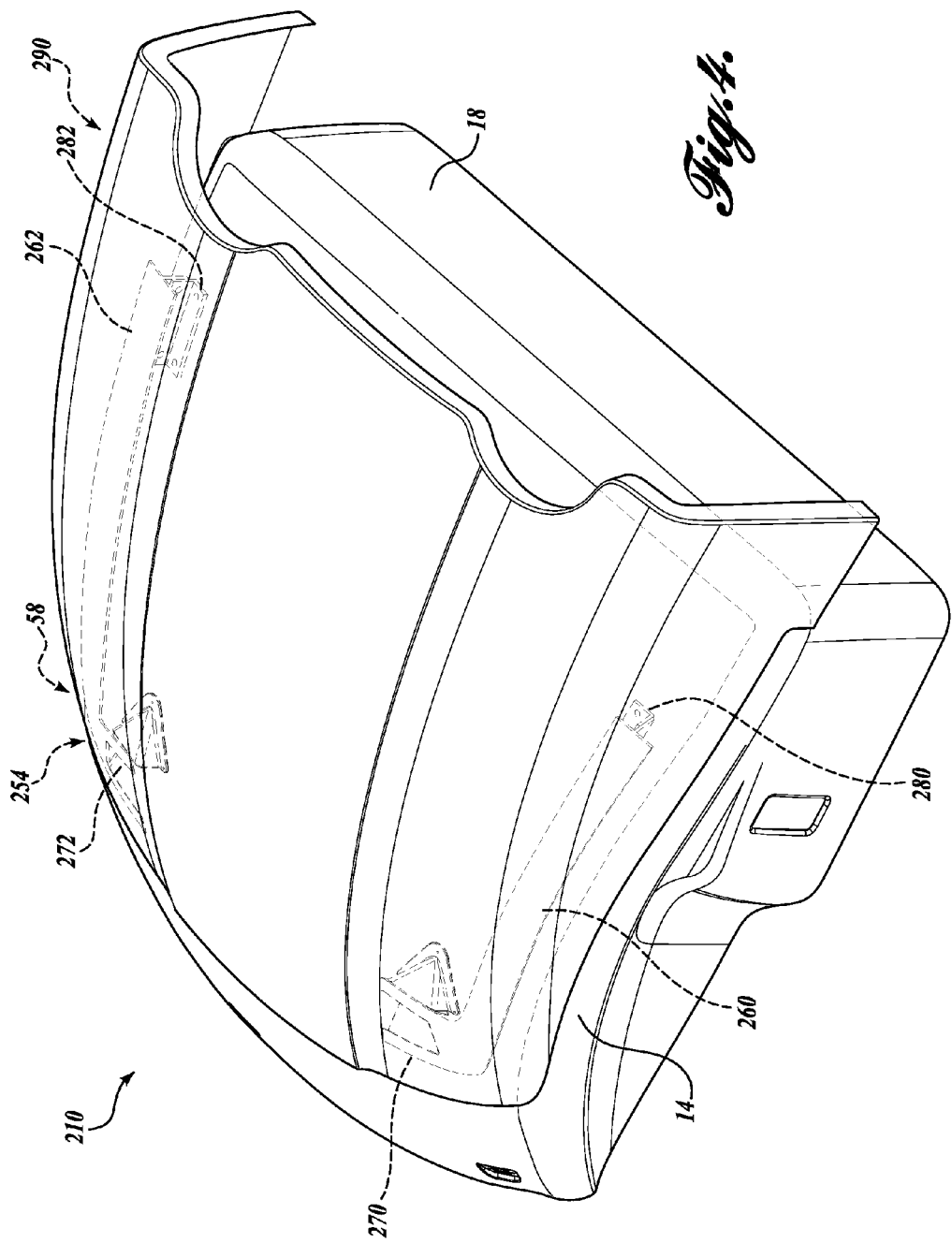
FIG. 4 is an isometric view of a fairing mounting assembly formed in accordance with a third exemplary embodiment of the present disclosure, wherein the fairing mounting assembly is shown in use with a fairing and a portion of a vehicle, and wherein the fairing is in a second position.

Referring to FIG. 4, a third exemplary embodiment of a fairing attachment assembly 210 is depicted. The fairing attachment assembly 210 is substantially identical to the fairing attachment assemblies 10 and 110 described above, except that it includes a fairing attachment assembly 290 defined in part by a portion of a fairing locator assembly 254.

The fairing locator assembly 254 differs from the fairing locator assembly 54 described above in that instead of a body portion extending between the first and second fairing locators 270 and 272 across the forward interior portion of the fairing 14, the fairing locator assembly 254 includes first and second body portions 260 and 262 extending aft from the first and second locators 270 and 272 laterally along the interior surface of the fairing 14. It should be appreciated that the fairing locator assembly 254 may additionally include a reinforcement body portion extending between the first and second fairing locators 270 and 272 across the forward interior portion of the fairing 14 without departing from the scope of the disclosure.

The fairing attachment assembly 290 further includes first and second brackets 280 and 282 that are securable to both the first and second body portions 260 and 262 and the sleeper compartment 18. The first and second brackets 280 and 282 may be secured to the first and second body portions 260 and 262 and the sleeper compartment 18 in a suitable manner, such as with fasteners, adhesive, etc.

Thus, it should be appreciated that any suitable assembly may be used for securing the rear portion of the fairing 14 to the sleeper compartment 18 to hold the fairing 14 aft in tension on the sleeper compartment 18. Accordingly, the descriptions and illustrations provided herein should not be seen as limiting the scope of the present disclosure.

While illustrative embodiments have been illustrated and described, it will be appreciated that various changes can be made therein without departing from the spirit and scope of the present disclosure.

The invention claimed is:

1. A fairing mounting assembly for securing a fairing to a vehicle, comprising:
    (a) a fairing locator assembly having at least one fairing locator securable to an interior surface of a forward portion of a fairing, the at least one fairing locator having a predetermined size and shape;
    (b) a locator attachment assembly securable to a portion of a vehicle, the locator attachment assembly having at least one isolator receptacle that is substantially sized and shaped to correspond to the predetermined size and shape of the at least one fairing locator; wherein the at least one fairing locator is receivable within the at least one isolator receptacle when the fairing is moved in the aft direction on the vehicle; and
    (c) a rear fairing attachment assembly configured to secure an aft portion of the fairing to the vehicle and maintain the at least one fairing locator within the at least one isolator receptacle.

2. The assembly of claim 1, further comprising an isolator disposable between the at least one fairing locator and the locator attachment assembly.

3. The assembly of claim 2, wherein the isolator substantially covers an entire exterior surface of the at least one fairing locator.

4. The assembly of claim 3, wherein the combined size of the at least one fairing locator and the isolator is greater than the size of the at least one isolator receptacle when the at least one fairing locator is disengaged from the locator attachment assembly.

5. The assembly of claim 4, wherein the isolator is comprised of a compressible material.

6. The assembly of claim 1, wherein the at least one fairing locator is substantially wedged-shaped.

7. The assembly of claim 1, wherein the at least one fairing locator is substantially cone-shaped.

8. The assembly of claim 1, wherein an interference fit is defined between the at least one fairing locator and the at least one isolator receptacle when the least one fairing locator is received within the at least one isolator receptacle.

9. The assembly of claim 1, wherein the rear fairing attachment assembly includes at least one bracket securable to both an aft portion of the fairing and the vehicle.

10. The assembly of claim 1, wherein the rear fairing attachment assembly includes a cable adjustably securable to the fairing at the forward portion of the fairing interior cavity and a portion of the vehicle.

11. The assembly of claim 1, wherein the fairing locator assembly includes a body portion securable to the interior surface of the fairing at the forward portion of the fairing interior cavity and extending toward the aft portion of the fairing, the at least one fairing locator extending from the body portion, wherein the body portion is securable to the vehicle.

12. A vehicle assembly, comprising:
    (a) a fairing having a forward portion, an aft portion, and an interior surface;
    (b) a vehicle; and
    (c) a fairing mounting assembly for locating and securing the fairing on the vehicle, the fairing mounting assembly comprising:
        (i) a fairing locator assembly having at least one fairing locator secured to the interior surface of the forward portion of the fairing, the at least one fairing locator having a predetermined size and shape;
        (ii) a locator attachment assembly secured to a portion of the vehicle, the locator attachment assembly having at least one isolator receptacle that is substantially sized and shaped to correspond to the predetermined size and shape of the at least one fairing locator; wherein the at least one fairing locator is receivable within the at least one isolator receptacle when the fairing is moved in the aft direction on the vehicle; and
        (iii) a rear fairing attachment assembly configured to secure the aft portion of the fairing to the vehicle and maintain the at least one fairing locator within the at least one isolator receptacle.

13. The assembly of claim 12, further comprising an isolator disposable between the at least one fairing locator and the locator attachment assembly.

14. The assembly of claim 13, wherein the isolator substantially covers an entire exterior surface of the at least one fairing locator.

15. The assembly of claim 14, wherein the combined size of the at least one fairing locator and the isolator is greater than the size of the at least one isolator receptacle when the at least one fairing locator is disengaged from the locator attachment assembly.

16. The assembly of claim 15, wherein the isolator is comprised of a compressible material.

17. The assembly of claim 12, wherein the at least one fairing locator is substantially wedged-shaped.

18. The assembly of claim 12, wherein the rear fairing attachment assembly includes at least one bracket securable to both the aft portion of the fairing and the vehicle.

19. The assembly of claim 12, wherein the rear fairing attachment assembly includes a cable adjustably securable to the fairing at the forward portion of the fairing interior cavity and a portion of the vehicle.

20. The assembly of claim 12, wherein the fairing locator assembly includes a body portion securable to the interior surface of the fairing at the forward portion of the fairing interior cavity and extending toward the aft portion of the fairing, the at least one fairing locator extending from the body portion, wherein the body portion is securable to the vehicle.

21. A fairing mounting assembly for securing a fairing to a vehicle, comprising:
    (a) a fairing locator assembly having at least one fairing locator securable to an interior surface of a forward portion of a fairing, the at least one fairing locator having a predetermined size and shape;
    (b) a locator attachment assembly securable to a portion of a vehicle, the locator attachment assembly having at least one isolator receptacle that is substantially sized and shaped to correspond to the predetermined size and shape of the at least one fairing locator; and
    (c) a rear fairing attachment assembly configured to secure an aft portion of the fairing to the vehicle, wherein the rear fairing attachment assembly includes a cable adjustably securable to the fairing at the forward portion of the fairing interior cavity and a portion of the vehicle.

22. A vehicle assembly, comprising:
(a) a fairing having a forward portion, an aft portion, and an interior surface;
(b) a vehicle; and
(c) a fairing mounting assembly for locating and securing the fairing on the vehicle, the fairing mounting assembly comprising:
  (i) a fairing locator assembly having at least one fairing locator secured to the interior surface of the forward portion of the fairing, the at least one fairing locator having a predetermined size and shape;
  (ii) a locator attachment assembly secured to a portion of the vehicle, the locator attachment assembly having at least one isolator receptacle that is substantially sized and shaped to correspond to the predetermined size and shape of the at least one fairing locator; and
  (iii) a rear fairing attachment assembly configured to secure the aft portion of the fairing to the vehicle, wherein the rear fairing attachment assembly includes a cable adjustably securable to the fairing at the forward portion of the fairing interior cavity and a portion of the vehicle.

\* \* \* \* \*